Jan. 19, 1960 C. P. GINSBURG ET AL 2,921,990

MAGNETIC TAPE SYSTEM AND METHOD

Filed Dec. 13, 1955 4 Sheets-Sheet 1

INVENTORS
CHARLES P. GINSBURG
SHELBY F. HENDERSON, JR.
RAY M. DOLBY
CHARLES E. ANDERSON

BY Flehr & Swain

ATTORNEYS

INVENTORS
CHARLES P. GINSBURG
SHELBY F. HENDERSON, JR.
RAY M. DOLBY
CHARLES E. ANDERSON
BY
ATTORNEYS

INVENTORS
CHARLES P. GINSBURG
SHELBY F. HENDERSON, JR.
RAY M. DOLBY
CHARLES E. ANDERSON
BY
ATTORNEYS

INVENTORS
CHARLES P. GINSBURG
SHELBY F. HENDERSON, JR.
RAY M. DOLBY
BY CHARLES E. ANDERSON
Flehr & Swain
ATTORNEYS 2,921,990

MAGNETIC TAPE SYSTEM AND METHOD

Charles P. Ginsburg, Los Altos, Shelby F. Henderson, Jr., Woodside, Ray M. Dolby, Cupertino, and Charles E. Anderson, San Carlos, Calif., assignors to Ampex Corporation, Redwood City, Calif., a corporation of California Application December 13, 1955, Serial No. 552,868

18 Claims. (Cl. 179—100.2)

This invention relates generally to electromagnetic tape apparatus, and particularly to systems and methods of this character capable of recording and/or reproducing signal intelligence over a wide frequency spectrum, including for example, video frequencies.

In our copending application Serial No. 524,004, filed July 25, 1955, for "Broad Band Magnetic Tape System and Method," there is disclosed a system making use of a rotary head assembly for recording and/or reproducing signals over a wide frequency spectrum. One practical use for such a system is the recording and reproduction of television programs. The head assembly used in that system employs a plurality of transducer units that are mounted to rotate and sweep transversely across a magnetic tape. Special speed control means is employed for driving the head assembly and the magnetic tape during recording and to insure accurate tracking and synchronization for playback operations. The tape employed is relatively wide compared with conventional magnetic tape practice, and for example may be about two inches in width. Side margins of the taps can be employed for sound recording and for recording a control frequency for the speed control means. A feature of the system disclosed in said copending application is that it employs FM carrier recording, although the rotary head assembly and associated mechanical parts can be used for direct recording or for any one of a number of carrier recording methods.

One problem involved in the operation of such systems is that it is difficult to build separate pieces of equipment with precisely the same angular spacing between the transducer units. If the transducer units for the playback equipment have an angular spacing which differs a slight amount from the angular spacing in the equipment used for recording, noticeable distortion occurs. Where television images are being reproduced this is manifest by a lateral displacement of horizontal picture bands, where each picture band represents the information played back by one transducer unit. Another problem involved is that the tips of the transducer units in contact with the magnetic tape are subject to wear, with the result that over a period of time the sweep radius of the tips of the units decreases. This causes slight reduction in the circumferential spacing between the tips of the transducer units, which causes distortion in reproduction. Likewise the difficulties involved in producing precisely identical rotary head assemblies tends to introduce variations in radial spacing between a particular recording equipment, and the equipment being used for playback. In addition to the foregoing, slight changes may occur in the width of the tape between periods of recording and reproduction.

In general it is an object of the present invention to provide a novel arrangement which serves to compensate for variations in angular spacing between the transducer units of the recording and reproducing equipment.

Another object of the invention is to provide an arrangement which serves to compensate for variations in sweep radius of the transducer tips, due either to manufacturing tolerances or wear.

Another object of the invention is to provide an arrangement which serves to compensate for variations in the width of the tape.

Another object of the invention is to provide an improved system of the type disclosed in our above-mentioned copending application.

Additional objects and features of the invention will appear from the following description in which the preferred embodiments have been set forth in detail in conjunction with the accompanying drawing.

Referring to the drawing.

Figure 1:
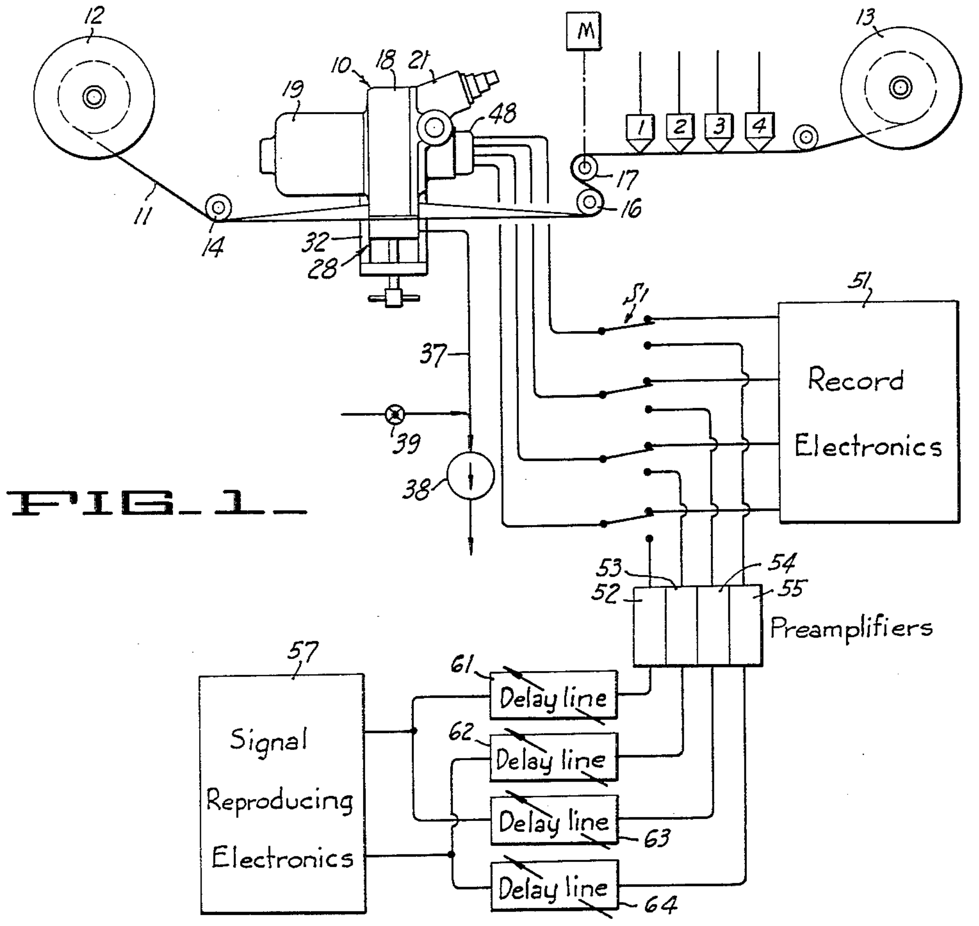
Figure 1 is a schematic block diagram illustrating the general system of the present invention.

The present system and method employs apparatus 10 (Figure 1) of the type having a plurality of record (i.e. transducer) units that are caused to sweep successively across a magnetic tape, as the tape is being moved by transport means in the direction of its length. Preferably the sweep paths of the units is rectilinear, and a portion of the tape is cupped or curved to conform to the surface of a cylinder in the region where it is being contacted by the units. The transport means illustrated for carrying and feeding the tape 11 includes conventional supply and takeup reels 12 and 13, carried by suitable turntables. In accordanec with customary practice a suitable motor is provided for the turntable 12 for applying a constant torque to maintain proper tape tension during recording or playback. Also this motor can be energized for rewind operations. A motor is also associated with the turntable for reel 13, to apply constant torque for tape takeup. Guide studs or rollers 14 and 16, which are preferably flanged, are disposed to engage the tape at spaced distances from the operating end of the head assembly. The tape also engages a driving capstan 17, and as will be presently explained it may engage a number of additional stationary magnetic heads 1, 2, 3 and 4 for operating upon the side margins of the tape. As previously mentioned the tape employed is of substantial width compared to tape used with conventional magnetic equipment, and for example may have a width of the order of two inches. Its construction can be similar to magnetic tape now available on the market for sound recording, and it can consist of a pliable film of plastic material having a thin coating of magnetic material on one side of the same.

The head assembly 18 is driven by an electric motor 19. Pulse generating means 21 is associated with the head assembly and serves to generate pulses having a frequency dependent upon the speed of rotation. The pulses thus generated are used in conjunction with the speed control system.

Figure 4:
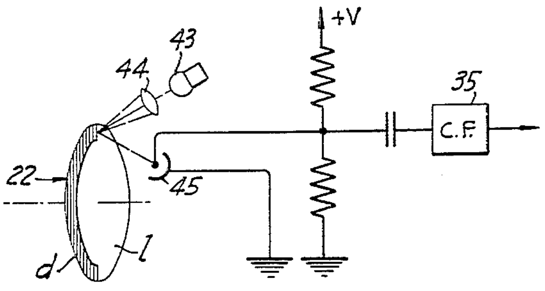
Figure 4 is a circuit diagram schematically illustrating the pulse generator.
Figures 2, 3:
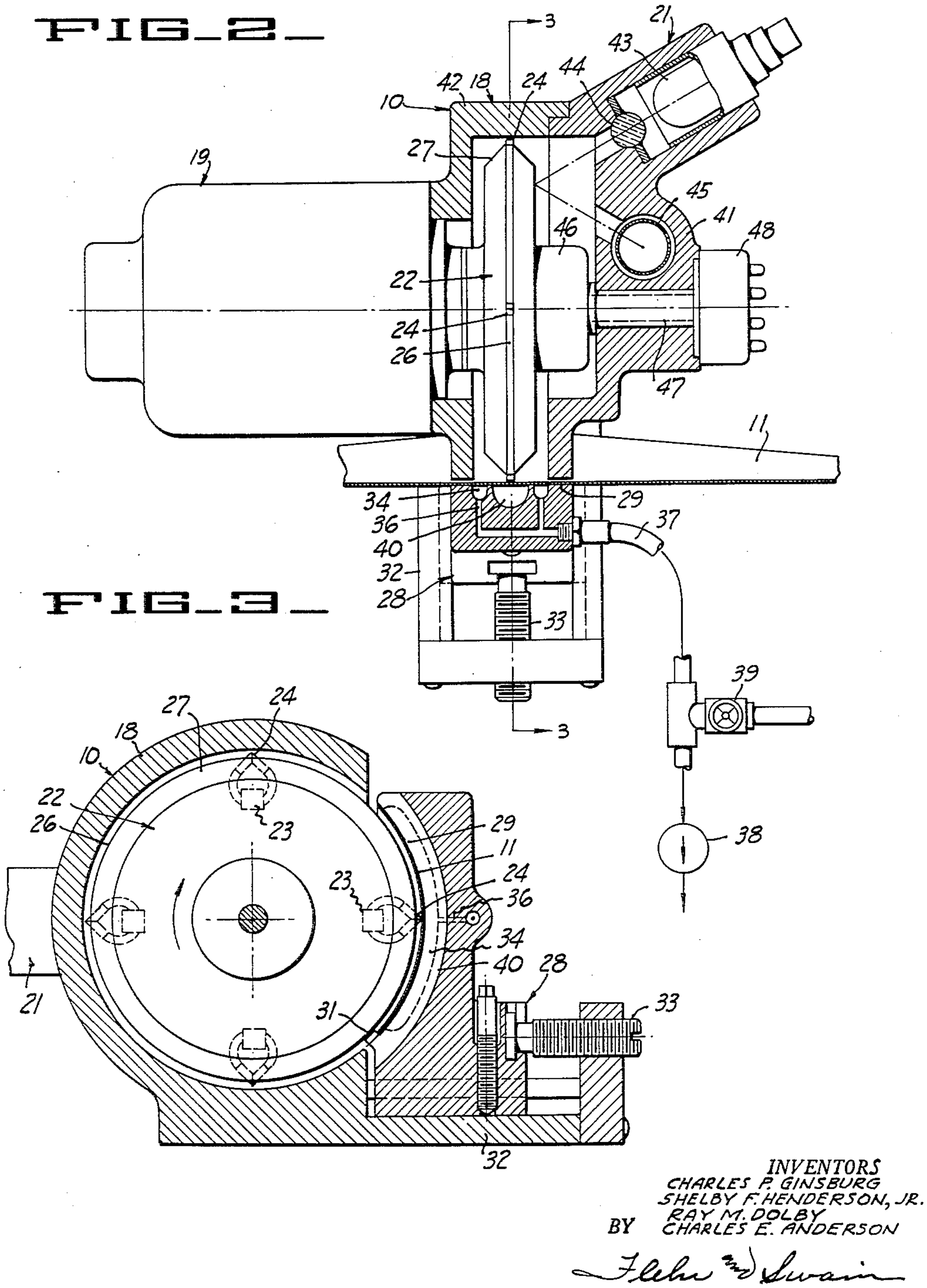
Figure 2 is a plan view partly in section illustrating the rotary head assembly and associated parts.
Figure 3 is a cross sectional view taken along the lines 3—3 of Figure 2.

Suitable details for the rotary head assembly and the pulse generating means are shown in Figures 2–4, inclusive. A wheel 22 is directly mounted upon the shaft of motor 19, and carries a plurality of transducer units 23. Each of these units consists of a suitable magnetic core together with a coil winding. Tips 24 of the units are made of relatively hard magnetic material, and project a short distance from the periphery 26. Preferably the wheel is beveled as indicated at 27, whereby the peripheral surface 26 has a width corresponding generally to the width of the tips 24. The thin nonmagnetic gap between the tips of each unit may be in a plane coincident with the axis of rotation and perpendicular to the plane of the wheel.

Adjacent one side of the wheel 22 there is a tape retaining or holding means 28 that holds the tape in the desired cupped condition and presents it for contact with the tips of the transducer units. As viewed in Figure 3 the holder 28 has a tape engaging surface 29 formed on an arc of a circle having the axis of the motor shaft as its center. One or more stops or shoulders 31 are provided for engaging one edge of the tape. The holder can be mounted upon a guideway 32, provided with means such as the adjusting screw 33, whereby it may be set in proper position relative to the motor shaft. Preferably pneumatic means is employed to insure constant contact of the tape with the arcuate surface 29. Thus grooves 34 are provided which may terminate short of the upper and lower ends of the arcuate surfaces 29, and which are shown connected by ducts 36 with the tube 37. This tube is connected to a source of vacuum, represented by the vacuum pump 38. For a purpose to be presently described it is preferable that the vacuum be adjustable, and this can be accomplished by providing an adjustable bleed-in valve 39, connected with the line 37.

We prefer that the pulse generating means be constructed as shown in Figure 2. In this instance the mounting 41 is provided, which in conjunction with the housing part 42, forms a shroud or housing for the wheel 22. A source of light, such as the electric lamp 43, is focused by lens 44 upon one side of the wheel 22. Light reflected from the wheel is received by the photoelectric tube 45. As shown in Figure 4 one segment *d* of the wheel is darkened, and another segment *l* made light reflecting. Figure 4 also illustrates the photoelectric tube being coupled to the cathode follower 35, the output from which is applied to the motor control system.

Figure 3 illustrates a manner in which the magnetic tape 11 is cupped as it moves past the wheel 22 and in contact with the curved surface 29 of the holder. The holder is recessed or cut-away as indicated at 40, for the entire length of the arcuate surface 29, whereby that portion of the tape spanning this recess is contacted by the tips 24 of the transducer units. Normally the contact is with sufficient pressure to slightly stretch and indent the tape in the small localized region being contacted by a transducer tip.

Suitable means are provided to facilitate making external connections with the several transducer units. Thus suitable slip ring means can be provided within the wheel hub 46, and the leads from the same are taken out through the tube 47 to the terminal block 48. One side of each transducer unit can be grounded, and the other side connected to slip ring means which in turn connects with an individual lead for external connection.

In Figure 1 the tabs of the terminal block 48 are shown connected to the change over switch S1, which has one set of its contacts connected with the record electronics 51. In a typical instance this can consist of means for producing a modulated carrier together with suitable record amplifiers. The other set of contacts of switch S1 connect with playback electronics, which can consist of preamplifiers 52, 53, 54 and 55, together with a signal reproducing electronics 57. Where a carrier frequency is amplitude modulated by the signals, and the AM carrier recorded, the electronics 57 can consist of conventional demodulating means and signal amplifiers. Where FM recording is employed, these electronics can consist of FM detecting means and signal amplifiers.

Interposed between the preamplifiers and the reproducing electronics 57, we provide variable delay lines 61, 62, 63 and 64. These delay lines should have broad band characteristics, and should be capable of sufficient adjustment to compensate for the variations in angularity previously mentioned.

Operation of the apparatus and system described above is as follows: Assuming that a record has been made on the tape by the use of apparatus substantially the same as that illustrated in Figure 1, and that it is desired to reproduce the tape on a different piece of equipment, the tape is threaded between the wheel 22 and the holder 28, and the motor 19 is energized together with the capstan motor M. The speed of rotation of the wheel 22 is approximately the same as the wheel used for recording, and the motor attached to the capstan 17 is controlled to provide a tape driving speed proper to maintain synchronism between the record tracks and the sweeps of the transducer units. Assuming now that the wheel 22 for the playback apparatus has its transducer units mounted in such a manner that the angularity between units is slightly different from that of the recording apparatus, then without the delay lines 61–64, some distortion will be experienced with respect to the reproduced signal. Where the reproduced signal is being used to reproduce a visual image, as in television recording and reproduction, such distortion is evidenced by a lateral shifting between horizontal bands of the picture. To correct for such inaccuracies the delay lines 61–64 are adjusted with respect to each other, until the undesired distortion has been eliminated, or in other words until corrections have been made to compensate for the inaccuracies due to differences in angularity. If desired the delay lines can be calibrated to facilitate making prearranged adjustments, or the adjustments can be made with the aid of a visual image or other reproduced indicating means, which reveals the extent of the distortion.

Previous reference has been made to another type of distortion due to wear of the transducer tips, or to the fact that the transducer tips in the playback apparatus have a sweep radius slightly different from the sweep radius of the apparatus used for recording. Also we have referred to changes in the width of the tape that may occur between periods of recording and reproduction, and which may be caused by such factors as variations in temperature. We compensate for errors due to such variations by adjusting the degree of partial vacuum applied to the groves 34. Assuming that for playback the same partial vacuum is used as for recording, and that in both instances the motors applied to the supply reels 12 apply equal back torques, the pressure with which each transducer tip contacts the tape is the same. This of course assumes that the adjustment of the holders relative to the transducer units, is the same. When the partial vacuum applied to grooves 34 is increased, the frictional drag of the tape across the holder is increased, and there is an increase in the tension applied to the tape in the direction of its length, having refernece particularly to that portion of the tape which spans the recess 40. Such increase in tape tension increases the effective pressure between the tape and the tip of each transducer unit, with the result that in the region of contact of a transducer tip, the indentation of the tape is correspondingly increased. This has the effect of causing a stretch of the tape in the localized region of contact with a tip, and such stretch in effect increases the length of the record track for a complete sweep. It will be evident that this type of adjustment serves to compensate for wear of the tips of the transducer units in a particular playback equipment, or it may be used to compensate for a slight difference between the playback equipment, and the equipment used for recording. Also it may compensate for variations in tape width that may occur between periods of recording and reproduction. As previously explained the changes in partial vacuum can be made by adjusting the setting of the bleed-in valve 39.

Another means of compensating for picture distortions caused by a variation or change in wear of the tips of the transducer units, or by dimensional changes in the tape (i.e., changes in width), consists in moving the entire holder 29 toward or away from the axis of the drum by means of the adjusting screw 33. Although this type compensating adjustment is accompanied by certain resultant non-linearities, these non-linearities over a limited range of operation are small in comparison to the errors for the correction of which they are necessary. It will be evident that such adjustment of the holder can be applied either by itself or in conjunction with adjustment of the vacuum.

It will be evident from the foregoing that we have provided for adjustments to take care of errors due to a variety of causes. These adjustments can be applied individually and in conjunction with each other, as required.

Figure 6:
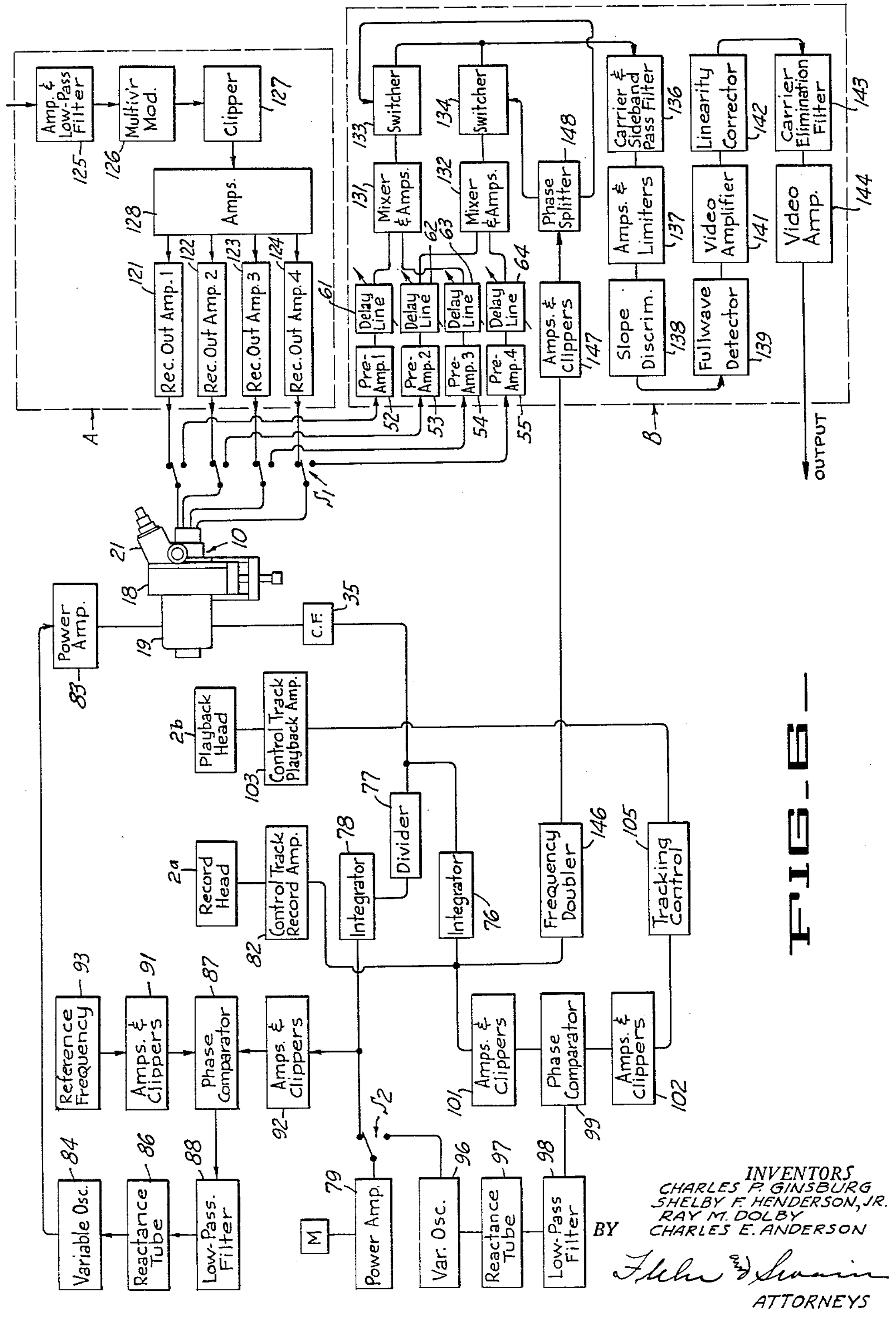
Figure 6 is a schematic block diagram illustrating the complete system.

Figure 6 illustrates a more complete system for recording and playback operations, and includes a motor control system, and FM carrier recording. The motor control system incorporated in this diagram consists of a wave shaping filter or integrator 76 and the frequency divider 77, both connected to the output of the cathode follower 35. The divider serves to reduce the frequency of the pulses to a frequency convenient for operating the synchronous alternating current motor M (e.g. from 240 to 60 c.p.s.), which is schematically indicated for driving the capstan. The output of divider 77 is shown being passed through filter or integrator 78, and from thence through switch S2 to the power amplifier 79. The output of this amplifier supplies current to the capstan driving motor M. Integrators 76 and 78 may be simple LC circuits tuned to the frequency being passed and serving to shape the wave to more nearly sine form.

The frequency of the pulse generating means is also recorded upon one margin of the tape, as a recorded control frequency. Thus the filter or integrator 76 connects with the amplifier 82 which in turn has its output applied to the record head 2 (shown as block 2*a* in Figure 6). This record head operates upon one margin of the tape, and serves to record a control frequency.

The motor 19 for driving the head assembly is supplied with alternating current from power amplifier 83, which has its input connected to the variable oscillator 84. The variable oscillator includes suitable means such as the variable reactance tube 86, whereby the frequency of operation of the oscillator can be controlled by varying the vaue of a controlling voltage. The controlling voltage is applied to the reactance tube by the phase comparator 87, which connects to the reactance tube through the low pass filter 88. The amplifiers and clippers 91 and 92 are both connected to the phase comparator 87. A suitable source 93 of reference frequency, such as the ordinary 60 cycle current supply, connects with the amplifiers and clippers 91. The amplifiers and clippers 92 connect to the output of the wave shaping filter or integrator 78. Assuming that the integrator 78 supplies current at a frequency of 60 c.p.s., and that the source 93 is nominally of the same frequency, then a controlling voltage developed by the phase comparator 87 is of a value dependent upon the amount of phase difference between the two applied alternating currents, namely that suplied from the reference and from the filter 78. The amplifiers and clippers 91 and 92 insure application of currents of the same amplitude to the phase comparator.

It will be evident from the foregoing that during a recording operation the frequency supplied by the pulse generating means is recorded as a control frequency along one margin of the tape, and a submultiple of this frequency, as for example 60 c.p.s., is applied to the phase comparator 87, together with a like frequency supplied from the reference source 93. Phase differences cause a change in the control voltage applied by the phase comparator to the reactance tube 86, and this causes compensating changes in the frequency supplied to the driving motor 19.

For reproducing operations switch S2 is shifted to connect the input of the amplifier 79 to the output of the variable oscillator 96. This oscillator includes the reactance tube 97, and is supplied through the low pass filter 98, with a controlling voltage from the phase comparator 99. The amplifiers and clippers 101 and 102 both apply signals of the same amplitude to the phase comparator 99. The amplifier and clipper 101 connects to the output of the wave shaping filter or integrator 76, and therefore receives a frequency corresponding to that generated by the pulse generator. The amplifier and clipper 102 connects to the output of amplifier 103, the input of which connects to the head 2 (shown as block 2*b* in Figure 6) when used as a playback head in reproducing operations. During reproducing operations it is apparent that the capstan motor M is under close control by virtue of the manner in which the frequency of the current from power amplifier 79 is determined by the frequency of operation of the variable oscillator 96. The variable oscillator in turn is controlled by the value of the controlling voltage supplied from the phase comparator 99, and such value is determined by the phase relationship between the frequency of the pulse generator, and the frequency derived from the previously recorded control frequency, by the head 2. This causes the motor M to drive the tape past the rotary head assembly at a speed precisely the same as that used during recording, and if slight variations in such speeds occur during recording, the same variations will be applied during reproduction. During reproduction the motor 19 is again controlled in the same manner as during recording.

Interposed between the playback amplifier 103 and the amplifiers and clippers 102, there is a so-called tracking control 105. This is a simple phase adjusting device, and its adjustment during operation of the apparatus serves to bring the transducer units into proper tracking relation with the recorded tracks on the tape. The tracking control 105 can be pre-set so that any correspondence between heads and tracks will be obtained automatically during the playback operation.

In Figure 6 the electronics connected to the units of the head assembly and used in recording, are indicated at A, and the electronics for playback or reproduction at B. For recording we have shown the record amplifiers 121, 122, 123 and 124, having their outputs connected to the contacts of changeover switch S1. The broad band input, which may be video frequencies, is shown being applied through the amplifier and low pass filter 125 to the multivibrator modulator 126. The output of the multivibrator modulator 126 is applied through the clipper 127 to the multichannel amplifier 128, which in turn connects with the inputs of the output amplifiers. The clipper stage 127 serves to limit the amplitude of the signal.

The playback electronics B includes the preamplifiers 52–55 and the variable delay lines 61–64, described with reference to Figure 1. The outputs of delay lines 61 and 63 are applied to the mixer and amplifiers 131. The outputs of delay lines 62 and 64 are similarly applied to the mixer and amplifiers 132. The outputs of 131 and 132 are applied through the electronic gating or switching devices 133 and 134, to form a combined output. The combined output from the switching devices is applied through the carrier and sideband pass filter 136, to the amplifiers and limiters 137. The output from 137 is then applied through the slope detector 138, to the detector 139, which preferably is of the full wave type. The signal from detector 139 is amplified at 141, and applied through the linearity corrector 142 and the carrier elimination filter 143, to the video amplifier 144. The output of this amplifier provides the signal having the video or other frequencies of the original signal input.

Filter 136 is constructed to prevent the passage of low frequency rectified components to the slope detector 138. When the system is operated on video frequencies, this filter can be made to pass only frequencies above 800 kc. The slope detector can be of the resistance-capacity type having a 6 db per octave amplitude-versus-frequency characteristic. The slope detector is untuned in order to give the desired wide band response. The linearity corrector 142 can likewise be of a type known to electronic engineers. It is adjusted to provide so-called gamma correction, and introduces distortion which serves to compensate for amplitude distortions due to the use of the slope detector 138.

The electronic switching or gating devices 133 and 134 are controlled by voltages derived from the pulse generating means. Thus a frequency doubler 146 has its input connected to the integrator 76, and supplies alternating current at a suitable frequency (e.g. 480 c.p.s.) to the amplifier and clippers 147, and the phase splitter 148. Thus timed voltages of opposite polarity are obtained for application to the switchers 133 and 134, whereby these switchers alternately pass the outputs from the mixers and amplifiers 131 and 132, during successive intervals.

Overall operation of the system shown in Figure 6 is as follows: Assuming by way of example that the speed of movement of each transducer unit on the rotary head assembly is of the order of 1500 inches per second relative to the tape, it is satisfactory for television recording to employ a center frequency of 4.5 megacycles. At present a frequency of 5 megacycles is near the upper frequency limit which can be effectively handled by the system that we have used with good results, although we have demonstrated the feasibility of recording and reproducing frequencies as high as 6 megacycles. For frequencies above about 4 to 4.5 megacycles there is a fall-off in effective recording. However the fall-off is gradual, and is not an abrupt cut-off such as might cause undesirable effects. Furthermore, we anticipate the extension of the frequency capabilities of our system to a point considerably beyond the limitations of our system as demonstrated to date. In the present system we employ vestigial sideband FM recording with the carrier frequency located in the upper end of the spectrum which the system is capable of handling. Thus, a gradual attenuation of the upper sidebands is brought about through the action of the head and tape system.

The system of Figure 6 makes use of narrow band frequency recording. Where $\Delta f$ represents deviation corresponding to maximum signal amplitude and $f_m$ represents the highest modulating frequency, the ratio of $\Delta f/f_m$ is relatively small, and in practice, making use of the values mentioned in the preceding paragraph, can be of the order of 0.1 or 0.2. The frequency deviation from the center frequency can be such that the center frequency of 4.5 megacycles which is impressed on the tape may depart from its quiescent value by 500 kc., when the amplitude of the modulating signal is at its highest value.

It will be evident to those familiar with television systems that an input of video frequencies may be obtained from a standard television receiver, or may be taken directly from the output of the camera chain. Similarly the reproduced video output can be used to reproduce a visual image by utilizing an ordinary television receiver, including the synchronizing pulse and scanning auxiliaries, and the amplifying means ordinarily associated with the same. With the system of Figure 6 the synchronizing pulses can be recorded together with the video frequencies, and reproduced together with the video frequencies for proper control of the television receiver.

Figure 5:
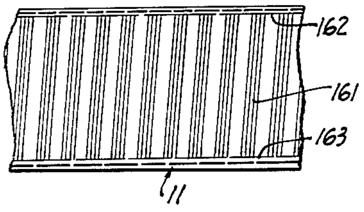
Figure 5 is a plan view illustrating record tracks on the magnetic tape.

Figure 5 illustrates a portion of a typical magnetic tape 11 with recorded tracks or areas upon the same.

The areas 161 (exaggerated as to width and spacing) represent the rectilinear track areas which are swept by the magnetic head units, and these areas are slightly spaced apart in the direction of the length of the tape, and are disposed at an angle slightly less than 90° with respect to the length of the tape. By way of example, where the magnetic tape is two inches in width, each record area may have a width as measured lengthwise of the tape of about 10 mils. Dotted lines 162 and 163 represent the demarcation between the tracks which carry the picture intelligence, and the marginal edge portions over which the erase heads 1 and 3 are operated. Erase head 1 is shown operating immediately in advance of the head 2 during recording. On the other margin of the tape, head 3 can function as an erase head in advance of the head 4. Head 4 can be used for the recording of sound signals. Shortly before a transducer unit tip reaches the line 163 a succeeding head reaches the line 162. Switching operations occur shortly before the transducer units reach the lines 163. In Figure 5 it is assumed that the lower marginal edge is being used for the recording of audio frequencies, and the upper margin for recording the control frequency. In both instances the erase operations performed by heads 1 and 3 eliminates most but not all of the track portions carrying duplicate picture information.

For recording operations switches S1 and S2 are positioned as illustrated in solid lines. The rotary head assembly is started in operation by energizing the motor 19, and the tape is driven by starting the motor M. The speed of operation of both these motors is closely controlled in the manner previously described. The video input is applied to the amplifier and low pass filter 125, and the desired frequency modulated signal from clipper 127 is applied to the amplifier 128, and from thence to the separate record amplifiers 121–124, which energize the separate transducer units of the rotary head assembly. The result is that as each head unit sweeps across the tape it records the frequency modulated carrier in the manner previously described.

After a recording operation the motors are deenergized and the tape wound back upon the supply reel 12 for a playback operation. The tape may now be applied to another machine with the same electronics as is shown in Figure 6, but having a rotary head which may not be precisely the same as the rotary head used in the recording equipment, due to slight inacuracies in manufacture, or possibly wear during usage. The head driving and capstan motors of this apparatus are started in operation and by virtue of the manner in which the motors are controlled, the transducer units are caused to accurately track upon the recorded areas. In addition the speed of movement of each transducer unit with respect to its track is controlled to be precisely the same as during recording. The currents induced in the windings of the several head units are applied to the preamplifiers 52–55, and from thence to the mixers and amplifiers 131, 132, through the delay lines 61–64. The outputs of mixers and amplifiers 131 and 132 are alternately passed by the switching devices 133, 134, and combined for application to the carrier and sideband pass filter 136. After passing through the amplifiers and limiters 137, the FM signal is detected by the slope detector 138 and the full-wave detector 139, to provide a signal output that is amplified at 141, corrected as to linearity at 142, and applied to the filter 143. The carrier components are eliminated by filter 143, to provide a signal for application to the video amplifier 144.

The delay lines 61–64 are adjusted relative to each other to correct for any lateral displacement of horizontal bands of the reproduced image. The vacuum applied to the tape holder is adjusted to a value such that one corrects for any differences (between recording and reproducing) in the sweep radius of the transducer tips.

Using a center frequency of the order of 4.5 megacycles it is possible with the system of Figure 6 to record and reproduce signals ranging up to about 3.6 megacycles. This is ample for the recording and reproduction of television images.

Figure 7:
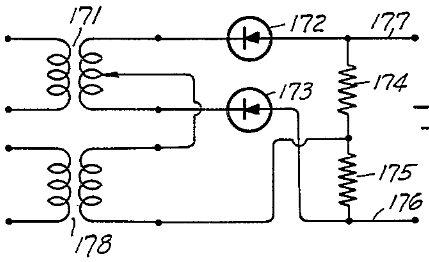
Figure 7 is a circuit diagram of a suitable phase comparator for use in the speed control system.

Various types of phase comparators can be used in connection with the motor control system. In Figure 7 we have shown a suitable phase comparator utilizing two diodes. Thus transformer 171 has its secondary terminals connected to the cathode of the diodes 172 and 173. The diodes have their anodes connected across load resistors 174 and 175, which in turn connect with the grounded conductor 176 and to the output conductor 177. A second transformer 178 has one terminal of its secondary connected to a center tap on the secondary of transformer 171. The other secondary terminal of transformer 178 connects to the point of connection between resistors 174 and 175. To briefly review its operation (i.e. for phase comparator 99), a frequency is applied to the primary of transformer 178 from the amplifier and clipper 101. The reproduced signal from amplifier and clipper 102 is applied to the primary of transformer 171. The voltage developed across the secondary of transformer 171 either adds to or subtracts from the secondary voltage of transformer 178, depending upon the instantaneous polarity relationship of the two signals. The average current of each of the diodes 172 and 173 depends upon the length of time during each cycle that their applied voltages are in additive or subtractive polarity. This in turn is dependent upon the phase angle between the two applied waves. When the phase angle is 90° or 270°, the average currents of the diodes are equal, and the equal voltages of opposite polarity are developed across load resistors 174 and 175. Hence the net voltage between conductor 177 and ground will be zero. If the phase angle departs from 90° to 270°, the average diode currents will become unbalanced, and the net output voltage between the conductors 177 and 176 will no longer be zero. Therefore the output voltage polarity will depend upon whether the phase angle is leading or lagging the 90° or 270° relation, and the magnitude will be proportionate to the amount of lead or lag. Assuming that both applied frequencies are of substantially the same wave form, a fairly linear relation between the output voltage and phase angle is obtained over a range of 90°. Since the current flow through the diodes is in the form of pulses, it is desirable to provide a low pass filter in the phase comparator output so that only a direct current voltage proportional to the average current is applied to the variable reactor 97.

Figure 8:
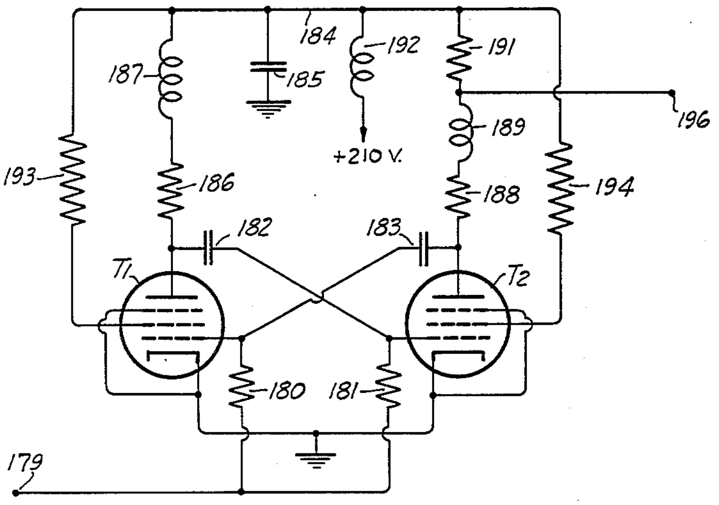
Figure 8 is a circuit diagram illustrating a suitable multivibrator modulator for use in the system.

A suitable multivibrator modulator for use in the system of Figure 6, is shown in Figure 8. It consists of vacuum tubes T1 and T2 each having its cathode and suppressor grid connected to ground. The input lead 179 is connected to the control grids of both tubes through the resistors 180 and 181, and the control grid of each tube is coupled to the plate of the other tube through the condensers 182 and 183. The plates of the tubes are connected to a common plate voltage supply conductor 184. The plate of tube T1 connects with conductor 184 through the series connected resistor 186 and inductance 187. The plate of tube T2 connects with conductor 184 through the series connected resistor 188, inductance 189 and resistor 191. Plate voltage is applied to conductor 184 through choke 192. The screens of both tubes are connected to the conductor 184, through the resistors 193 and 194. The output terminal 196 connects between the inductance 189 and the resistor 191.

The circuit shown in Figure 8 operates in a manner well known to those familiar with multivibrator modulators. The frequency of operation is responsive to voltage changes upon the input terminal 179. This terminal may connect with the output of a cathode follower forming the last stage of the amplifier and low pass filter 125. A feature of this multivibrator is that no bypassing is provided for the screens of the two tubes, and this facilitates operation over a wide frequency range.

In one particular instance the circuit shown in Figure 8 was constructed as follows. The tubes T1 and T2 were known by manufacturer's specifications at type 6CL6. The values of the resistors were as follows: 193 and 194, 27K (K equals 1,000 ohms); 186, 2.7K; 188, 1.8K; 180 and 181, 2.7K; and 191, 820 ohms. The inductances had values as follows: 187, 36 $\mu$h; 189, 36 $\mu$h; and 192, 180 $\mu$h. The capacitors had values as follows: 182 and 183, 56 mmf.; and 185, 0.02 mfd.

The multivibrator modulator referred to above by way of example has been operated successfully up to about eight megacycles. For television recording on a center frequency of 4.5 megacycles, it is satisfactory to use such a multivibrator for operation with a maximum frequency of six megacycles.

Figure 9:
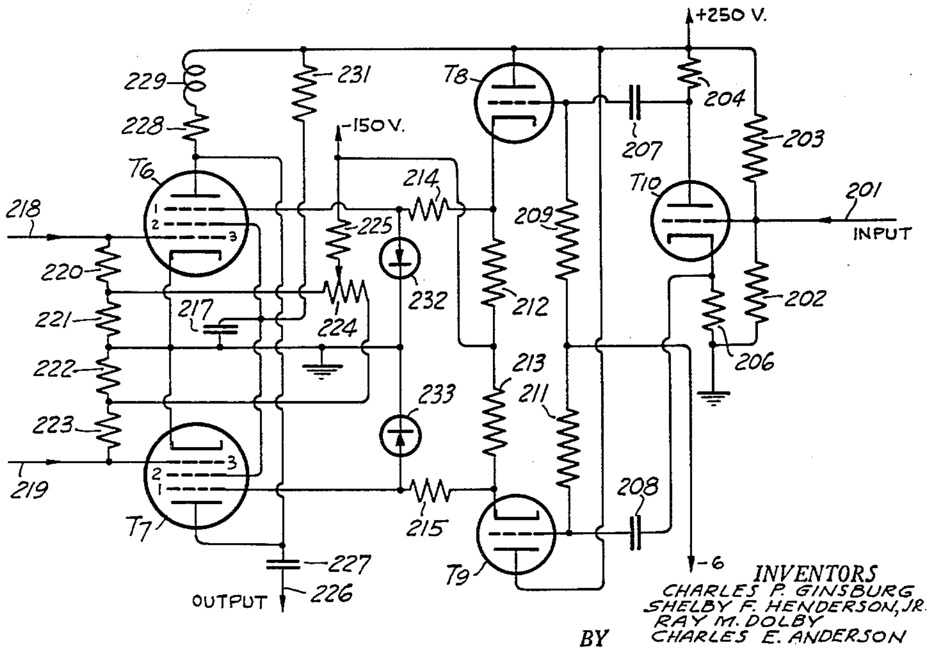
Figure 9 is a circuit diagram illustrating a suitable switching circuit.

Figure 9 illustrates a suitable circuit for the switchers 133 and 134, and also for the phase splitter 148. Cathode followers are incorporated in this circuit for coupling between the phase splitter and the switching tubes. In this instance tubes T6 and T7 function as switching tubes, tubes T8 and T9 function as cathode followers, and tube T10 serves as a phase splitter. The input lead 201 is applied to the control grid of tube T10, and this grid also connects to ground through grid resistor 202, and to a source of biasing voltage such as the common point of the resistors 203 and 202, which arrangement constitutes a voltage divider designed to supply the proper biasing voltage for the control grid. The plate of this tube connects to the indicated +250 v. through resistor 204, and the cathode connects to ground through the cathode resistor 206. The plate of tube T10 is coupled by condenser 207 with the control grid of cathode follower tube T8, and the control grid of tube T9 is similarly coupled to the cathode of tube T10, through condenser 208. The indicated −6 v. bias supply is connected to the control grids of tubes T8 and T9, through the resistors 209, 211. The indicated —150 v. supply connects with the cathodes of tubes T8 and T9, through the cathode resistors 212, 213. The plates of both these tubes connect to the indicated +250 v. supply. The suppressor grids 1 of the tubes T6 and T7 are connected to the cathodes of tubes T8 and T9, through the resistors 214, 215. The screen grids 2 of these tubes T6 and T7 are directly connected together and are connected to ground through condenser 217. The input leads 218, 219 (from the amplifiers 131 and 132) directly connect with the control grids of tubes T6 and T7. Also these leads are connected to ground through the series connected grid resistors 220, 221, and 222, 223. A potentiometer 224 has its one terminal connected to the point of connection between resistors 220 and 221, and its other terminal to the point of connection between resistors 222 and 223. The movable contact of this potentiometer is connected by resistor 225 to the indicated −150 v. supply. By adjusting the potentiometer 224, the bias upon the control grids of the tubes T6 and T7 can be adjusted for proper balanced operation. The output lead 226 is coupled to the plates of tubes T6 and T7, through condenser 227. These plates are directly connected, and also they connect through resistor 228 and peaking coil 229, to the indicated +250 v. supply. The screen grids 2 of the tubes T6 and T7 also connect to the +250 v. supply, through resistor 231.

Clamping means of the diode type are also provided in this circuit for preventing the suppressor grids 1 of the tubes T6 and T7, from becoming too positive. Thus diodes 232 and 233 connect between the suppressor grid 1 and ground for the tubes T6 and T7 respectively.

The circuit illustrated in Figure 9 functions as follows: Assuming that a substantially square wave is applied to the input lead 201, the phase splitter formed by tube T10 and its associated circuit components provides split phase voltages on the grids of the cathode follower tubes T8 and T9, which in turn are coupled to the suppressor grids 1 of tubes T6 and T7. Thus these grids are alternately driven between voltage values, to provide alternate conducting and nonconducting stages for the tubes T6 and T7. During the period that one of the tubes T6 or T7 is conducting, signals applied to one or the other of the corresponding input leads 218, 219, are repeated to the output lead 226.

By way of example in one instance the circuit of Figure 9 was constructed as follows: The vacuum tubes T6 and T7 were of a type known by manufacturer's specification as type 6AS6. The tubes T8 and T9 were of a type known by manufacturer's specification as type 12AT7. The tube T10 was of the type known by manfacturer's specification as type 12AT7. The diodes were of a type known by manufacturer's specification as type CK705. The various resistors had values as follows: 220, 270K; 221, 12K; 222, 12K; 223, 270K; 228, 3.3K; 231, 22K; 225, 750K; 224, 20K; 214 and 215, 47K; 212 and 213, 27K; 209 and 211, 1 megohm; 204, 2.2K; 206, 2.2K; 203, 180K; 202, 82K. The peaking coil 229 had an inductance of 150 $\mu$h. The condensers had values as follows: 217, 4 mfd.; 227, 0.25 mfd.; 207, 0.25 mfd.; 208, 0.25 mfd.

The switching circuit cited above by way of example gave good results with substantially instantaneous switching as determined by the pulses applied to the input lead 201. As previously described these pulses were derived from the photoelectric pulse generator associated with the rotary head.

It will be evident from the foregoing that we have provided a system and method that can be used for a wide variety of purposes where it is desired to record a wide frequency spectrum, ranging substantially higher than can be recorded by the use of conventional magnetic tape equipment. Particularly the invention can be used with good results for recording and reproducing television or like visual images. Because of the compensating means employed slight mechanical differences between the recording and the reproducing equipment can be compensated for in the manner previously described, thus facilitating use of a tape in any one of a plurality of reproducing equipment, with substantially equal performance.

In the foregoing the system and method employ delay lines for playback. Some advantages can be gained by using delay lines for recording operations. Thus the system of Figure 6 can be constructed to include four additional adjustable delay lines inserted between the amplifier 128 and the several record amplifiers 121, or between stages of the amplifiers 121–124. With such an arrangement, prior to making a recording, a standard tape record can be reproduced. By a standard tape record we have reference to one made with effectively perfect angular spacing between the transducer units, and which for example will have a test pattern recorded thereon. During such playback the delay lines are adjusted to obtain a proper test pattern without lateral band shifting. Suitable graduated indicators are provided for the adjustable elements of the delay lines, and after noting the individual settings, corresponding adjustments are made with respect to the record delay lines. By corresponding adjustments we have reference to adjustments in a reverse or complementary sense. For example, if each of the playback delay lines Nos. 2 and 4 inclusive are adjusted to delay by a specific amount with respect to the delay imposed by delay line No. 1, the record delay line No. 1 would be adjusted to delay an equal amount relative to the delay provided by the remainder of the record delay lines. Such adjustments can be facilitated by providing reverse calibrations for the two sets of delay lines. Assuming that corresponding or reverse adjustments are made in the manner described above, the system is now adjusted to make recordings that are perfect in that no errors are introduced because of inaccuracy in angular spacing of the transducer units. Also the playback delay lines are now in adjustment for reproduction of a standard tape or any tape that is made with effectively perfect angular spacing between the transducer units.

It will be evident that the system last described can be used in the same manner as systems having one set of delay lines. Thus the playback delay lines can be used to compensate and correct for errors in a record made on a machine having misadjusted record delay lines, or one having imperfect angular spacing of the transducer units without compensating delay lines.

We claim:

1. In a method for recording and reproducing a broad band frequency spectrum on a magnetic tape, wherein relative movement occurs at a predetermined speed between rotatable and circumferentially spaced transducer units and a magnetic tape upon which the record is made, the steps of forming a carrier modulated signal, applying the signal to rotating and circumferentially spaced magnetic transducer units, causing the transducer units to sweep successively across the tape while the tape is being progressed in the direction of its length, whereby the units sweep over and record substantially consecutive signal portions on successive adjacent track portions, subsequently sweeping the record track portions with rotating and circumferentially spaced reproducing transducer units to provide signal outputs, reproducing the original frequency components from said outputs, and changing the relative time relationship between the portions of the reproduced signal that are attributable to the various transducer units, thereby providing a reproduced signal that is compensated for inaccuracies in the angular spacing between thet transducer units.

2. A method as in claim 1 in which said last step is carried out by imposing predetermined time delays in transmission of the signal transduced by each of said units during reproduction, and the detection of each such signal to reproduce the desired frequency components.

3. In a method for recording and reproducing a broad band frequency spectrum, wherein a plurality of magnetic transducer units are employed and in which relative movement occurs between the transducer units and the tape during recording and reproduction, the steps of forming a signal comprising a carrier modulated in accordance with the frequency spectrum, causing the transducer units to move successively across the tape while the tape is being progressed in the direction of its length, whereby the transducer units sweep over successive adjacent paths, applying the signal to the transducer units whereby corresponding magnetic tracks are formed on the tape, subsequently sweeping the tape with reproducing transducer units to provide carrier modulated signal outputs, reproducing the original signal from the outputs, and compensating for any difference between the sweep radius of the reproducing transducer units and the recording transducer units, said last named step being carried out by controlling the contact pressure between the tape and each of the reproducing transducer units.

4. The method as in claim 3 together with the step of adjusting the relationship time between the signal outputs of the reproducing transducer units.

5. In a method for recording and reproducing a broad band frequency spectrum ranging higher than one megacycle at its upper end on a magnetic tape, wherein two sets of magnetic transducer units are employed, one for recording and the other for reproduction, the units of each set being adapted to sweep successively across the magnetic tape, the steps of forming a signal comprising a carrier modulated in accordance with the frequency components of the spectrum, causing the recording units to sweep successively across the tape at a predetermined relative speed between the units and the tape, with the tape being advanced in the direction of its length, whereby the units sweep over successive parallel tracks, a succeeding unit being in contact with the tape before the preceding unit leaves the tape, applying the modulated carrier signal to the recording units, whereby magnetic tracks are recorded on the tape, the tracks extending crosswise of the tape and being spaced in the direction of the length of the tape, subsequently sweeping the record tracks with transducer units to thereby provide a modulated output, controlling the pressure between the tape and the reproducing transducer units to compensate for differences between the sweep radius of the reproducing units and the sweep radius of the recording units, combining and detecting the signal outputs from the reproducing units to provide the original frequency components, introducing a time delay between each of the reproducing units and the step of combining and detecting the outputs, and controlling the time delay for each reproducing unit to thereby compensate for inequalities between the angular spacing of the reproducing units and the angular spacing of the recording units.

6. In apparatus for reproducing a broad band frequency spectrum, said apparatus being characterized by the use of a magnetic tape having record track portions recorded thereon extending crosswise of the tape and spaced in the direction of the length of the tape, said track portions representing substantially sequential portions of a recorded signal, a rotatable head assembly having a plurality of angularly spaced transducer units mounted thereon, holding and transport means for the tape serving to present the tape for contact with the transducer units and for moving the tape in the direction of its length, means for combining and detecting the outputs of the transducer units to form a reproduced signal, and an adjustable delay line inserted between each of the transducer units and said combining and demodulating means, said delay lines being separately adjustable.

7. In a system for reproducing a broad band frequency spectrum, said system being characterized by the use of a tape having record track portions extending crosswise of the tape and spaced in the direction of the length of the tape, said track portions representing substantially sequential portions of a recorded signal, a rotary head assembly including a plurality of transducer units spaced circumferentially, means for transporting and presenting the tape whereby the record track portions are caused to be swept by the transducer units, means for forming a reproduced signal from the outputs of the transducer units, and means for adjusting the contact pressure between the tape and the tips of the transducer units.

8. In apparatus for reproducing a broad band frequency spectrum, said system being characterized by the use of a magnetic tape having record tracks extending crosswise of the same and spaced in the direction of the length of the tape, a rotary head assembly including a plurality of circumferentially spaced transducer units, each transducer unit having a tip adapted to contact and sweep across the tape, transport means for moving the tape lengthwise and laterally of the path of movement of the transducer units, holding means adapted to engage the tape adjacent the head assembly and serving to present the tape for contact with the tips of the transducer units, said holding means including a curved guide surface for the tape and vacuum means for urging the tape into contact with said guide surface, and means for controlling the value of the vacuum applied to said vacuum means to thereby control the contact pressure between the tape and the tips of the transducer units.

9. In a system for recording and reproducing a broad band frequency spectrum, a recording rotary head assembly including a plurality of circumferentially spaced transducer units, holding and transport means for traversing a magnetic tape laterally of the path of movement of the units and to present the tape for contact with the units as they rotate, means providing a carrier modulated in accordance with the frequency components of said spectrum, means for applying said modulated carrier to the units of the recording head assembly, whereby record track portions are made extending crosswise of the tape and spaced in a direction corresponding to the length of the tape, a reproducing head assembly including a plurality of circumferentially spaced transducer units, means for holding and transporting the same magnetic tape whereby the tape is presented to the units of the reproducing assembly and whereby the reproducing units are caused to sweep over said record tracks, a plurality of delay lines separately connected to the reproducing units, and means connected to combine and detect the outputs of said delay lines to thereby provide a reproduced signal, said delay lines being separately adjustable to thereby compensate for inequalities between the angular spacing of the reproducing units and the angular spacing of the recording units.

10. A system as in claim 9 together with means for adjusting the contact pressure between the magnetic tape and the reproducing transducer units to thereby compensate for inequalities between the sweep radius of the reproducing transducer units and the sweep radius of the recording units.

11. In a method for recording and reproducing a broad band frequency spectrum on a magnetic tape, wherein relative movements occur at a predetermined speed between a plurality of transducer units and a magnetic tape upon which the record is made, the steps of forming a modulated carrier, modulation of the carrier being in accordance with the frequency components of the spectrum, applying the modulated carrier signal to the magnetic transducer units, imposing separate time delays in the outputs to such units, and causing the transducer units to sweep successively across the tape while the tape is being progressed in the direction of its length whereby the units sweep over and record portions of the signal on successive track areas, and adjusting the time delays to compensate for imperfect spacing between the sweeps of the transducer units.

12. A method as in claim 11 in which the tape is subsequently swept with reproducing transducer units to provide modulated carrier outputs, and the original signal from said outputs is reproduced, and in which time delays are interposed in the outputs of said units.

13. In a system for recording a broad band frequency spectrum, a recording rotary head assembly including a plurality of circumferentially spaced transducer units, holding and transport means for traversing a magnetic tape laterally of the path of movement of the units and to present the tape for contact with the units as they rotate, means providing a carrier modulated in accordance with the frequency components of said spectrum, means for applying said modulated carrier signal to the units of the recording head assembly whereby record track portions are made extending crosswise of the tape and spaced in a direction corresponding to the length of the tape, and a plurality of separately adjustable delay means interposed in said last named means to provide predetermined delays for the separate modulated carrier outputs being applied to said units.

14. In apparatus for recording or reproducing a broad band frequency spectrum, a rotary head assembly including a plurality of transducer units spaced circumferentially, means comprising a tape driving capstan for drawing the tape past the head assembly, guide means serving to engage the tape to present one side of the same for contact with the rotating transducer units, whereby the transducer units sweep across successive track portions of the tape, and means for controlling the effective length of sweep of each unit across the tape, said means including means for adjusting the contact pressure between each of the various units and the tape.

15. Apparatus as in claim 14 in which said last named means comprises a surface adapted to engage one side of the tape before the tape has progressed to the region of operation of said transducer units, and pneumatic means for adjustably urging the tape into frictional engagement with said surface.

16. Apparatus as in claim 15 in which said guide means comprises a member having a curved face formed on a radius having a center substantially coincident with the center of rotation of the transducer units, said face being interrupted by a recess adapted to be spanned by the tape, said recess permitting indentation of the tape in localized regions where the tape is being contacted by the transducer units.

17. Apparatus as in claim 14 in which said last means comprises means for adjusting the position of the guide means relative to the rotary head assembly.

18. Apparatus for recording or reproducing a broad band frequency spectrum, a rotary head assembly including at least one transducer unit adapted to move in a circular path, means for moving the tape past the head assembly, guide means serving to engage the tape to present one side of the same for contact with the rotating transducer unit, whereby the transducer unit sweeps repeatedly across the tape along different track portions, and means for controlling the effective length of each sweep of the unit across the tape, said means including means for adjusting the contact pressure between the transducer unit and the tape.

References Cited in the file of this patent

UNITED STATES PATENTS

| | | |
|---|---|---|
| 2,038,216 | Harrison et al. | Apr. 21, 1936 |
| 2,245,286 | Marzocchi | June 10, 1941 |
| 2,583,983 | Arndt et al. | Jan. 29, 1952 |
| 2,612,566 | Anderson et al. | Sept. 30, 1952 |
| 2,648,589 | Hickman | Aug. 11, 1953 |
| 2,685,079 | Hoeppner | July 27, 1954 |
| 2,694,748 | Johnson | Nov. 16, 1954 |